United States Patent [19]
Shibao

[11] Patent Number: 5,394,902
[45] Date of Patent: Mar. 7, 1995

[54] FUEL PUMP INLET CHAMBER ASSEMBLY FOR A VEHICLE FUEL TANK

[75] Inventor: Masaharu Shibao, Chiba, Japan
[73] Assignee: Nifco, Inc., Japan
[21] Appl. No.: 236,289
[22] Filed: Apr. 29, 1994
[51] Int. Cl.⁶ .............................................. E03B 11/00
[52] U.S. Cl. ..................... 137/565; 137/315; 137/574; 137/576; 123/509; 220/324; 220/326
[58] Field of Search ............... 137/574, 576, 565, 315; 220/4.13, 324, 326, 509; 123/514

[56] References Cited

U.S. PATENT DOCUMENTS

| | | | |
|---|---|---|---|
| 4,344,646 | 8/1982 | Michel | 220/326 |
| 4,901,882 | 2/1990 | Goncalves | 220/324 |
| 4,989,572 | 2/1991 | Giacomazzi et al. | 123/509 |
| 5,044,526 | 9/1991 | Sasaki et al. | 222/377 |
| 5,107,889 | 4/1992 | Sasaki et al. | 137/576 |
| 5,186,200 | 2/1993 | Kimura et al. | 137/576 |
| 5,263,458 | 11/1993 | Fujino et al. | 123/574 |

FOREIGN PATENT DOCUMENTS 2-51932  4/1990 Japan .
2-78422  6/1990 Japan .
2-262428 10/1990 Japan .

Primary Examiner—A. Michael Chambers
Attorney, Agent, or Firm—Skjerven, Morrill, MacPherson, Franklin & Friel

[57] ABSTRACT

In a fuel pump inlet chamber assembly having a communication passage which allows ejection of fuel from the fuel pump inlet chamber to the remaining part of the fuel tank only at a limited flow rate so that any short-term change in the fuel level due to the motion of the fuel inside the tank may not substantially affect the availability of fuel inside the fuel pump inlet chamber, the fuel pump is conveniently interposed in the interface between these two parts, thereby not only simplifying the assembling work but also allowing easy access to the fuel pump for servicing purpose. This takes advantage of the fact that the fuel pump inlet chamber is normally made of molded plastic material, and is required to be constructed from two pieces, i.e., the main body and the lid member. Thus, the fuel pump inlet chamber assembly can be made simple in structure and easy and economical to fabricate while allowing easy access to the fuel pump.

5 Claims, 2 Drawing Sheets

FUEL PUMP INLET CHAMBER ASSEMBLY FOR A VEHICLE FUEL TANK

TECHNICAL FIELD

The present invention relates to a fuel pump inlet chamber assembly for defining a small chamber inside a vehicle fuel tank to prevent premature exposure of a fuel pump inlet tube due to movement of the fuel surface level inside the fuel tank, and in particular to such a fuel pump inlet chamber assembly having means for conveniently mounting a fuel pump thereon.

BACKGROUND OF THE INVENTION

When a vehicle makes a turn with a low fuel level, the resulting lateral acceleration causes a bulk of the fuel in the tank to move to one end of the fuel tank due to its inertia. To prevent the inlet tube of a fuel pump from admitting air, instead of fuel, in such a situation before the fuel level becomes truly low enough, a partly enclosed small chamber is defined inside the fuel tank, and the inlet tube of the fuel pump is placed in this small chamber. Such fuel pump inlet chamber assemblies are disclosed in Japanese patent laid open publication (kokai) No. 2-262428, Japanese utility model laid open publications (kokai) Nos. 2-51932 and 2-78422.

According to such conventional fuel pump inlet chamber assemblies, the fuel pump is normally supported by the fuel inlet chamber assembly. More specifically, the fuel pump inlet chamber assembly is mounted on the bottom wall of the fuel tank via a chamber bracket, and a pump bracket integrally attached to the fuel pump is engaged with a cooperating recess provided in a wall of the fuel pump inlet chamber assembly. However, according to such a pump inlet chamber assembly, the use of a pump bracket adds to the number of the component parts included in the assembly, and increases the cost of the fuel tank assembly due to the increase in the work involved in the assembling process, and the increase in the cost for the component parts.

BRIEF SUMMARY OF THE INVENTION

In view of such problems of the prior art, a primary object of the present invention is to provide a fuel pump inlet chamber assembly which is simple in structure and easy and economical to fabricate.

A second object of the present invention is to provide a fuel pump inlet chamber assembly which is simple in structure and allows easy access to the fuel pump.

A third object of the present invention is to provide a fuel pump inlet chamber assembly which can support a fuel pump in a both simple and reliable manner.

These and other objects of the present invention can be accomplished by providing a fuel pump inlet chamber assembly for a vehicle fuel tank, comprising: a main body including a bottom wall, a side wall and an open top; a pump support surface defined in the main body; tank bracket means for securing the main body to a bottom wall of a fuel tank; a lid member adapted to be mounted on the open top of the main body by means of engagement means so as to define a substantially enclosed fuel pump inlet chamber inside the main body; a pump holding surface provided in the lid member; a communication passage provided in the main body for communicating the fuel pump inlet chamber with outside at a limited flow rate; and a fuel pump interposed between the support surface of the main body and the holding surface of the lid member.

Because the communication passage allows ejection of fuel from the fuel pump inlet chamber to the remaining part of the fuel tank only at a limited flow rate, for instance by using an orifice and/or a tortuous passage which may include a one-way valve, any short-term change in the fuel level due to the motion of the fuel inside the tank would not substantially affect the availability of fuel inside the fuel pump inlet chamber, the fuel pump can continue to draw fuel instead of air even when the fuel level is low, and the vehicle makes a sharp turn. Typically, the fuel pump inlet chamber is made of molded plastic material, and is required to be constructed from two pieces, i.e., the main body and the lid member. By taking advantage of this fact, the fuel pump can be conveniently interposed in the interface between these two parts, thereby not only simplifying the assembling work but also allowing easy access to the fuel pump for servicing purpose.

Normally, the fuel pump has a substantially cylindrical outer profile, and it is advantageous if the support surface and the holding surface consist of inclined surfaces for interposing the fuel pump between them in an inclined attitude. Thus, the inlet end of the fuel pump can be placed in a low position inside the inlet chamber while the fuel pump presents surfaces that can be conveniently clamped between the lid member and the main body. If the lid member is provided with an opening adjacent to the holding surface for exposing a part of the fuel pump, the size of the fuel pump inlet chamber assembly can be appropriately selected, and lead wires for the fuel pump can be conveniently passed through this opening.

According to a particularly preferred embodiment of the present invention, the holding surface and the supporting surface consist of part-cylindrical surfaces, and the holding surface and the support surface are each provided with a stopper for restricting axial movement of the fuel pump.

To the end of simplifying the assembling work, and if desired, allowing easy access to the fuel pump, elastic latches may be used for securing the main body to the bottom wall of the fuel tank, and mounting the lid member to the main body. The term "elastic latch" is intended to mean a wide range of latches which allow easy and quick engagement of two parts. Thus, the present invention can reduce the fabricating cost and improve the servicing convenience at the same time.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
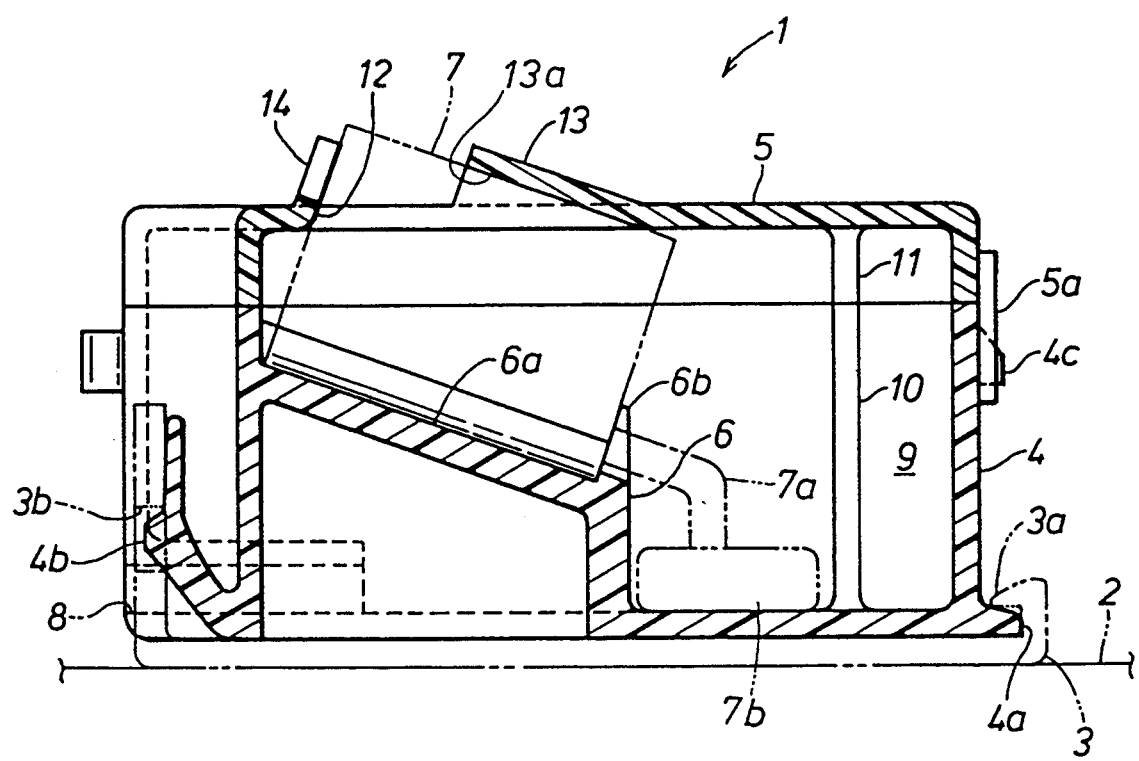
FIG. 1 is a sectional side view of a preferred embodiment of the fuel pump inlet chamber assembly according to the present invention.

FIG. 1 shows a chamber assembly 1 in a sectional side view. This chamber assembly 1 is fixedly secured to a bottom wall 2 of an automotive fuel tank, and can retain a certain amount of fuel therein even when the fuel level is low and the fuel has moved to one end of the fuel tank due to inertia or lateral acceleration so that the suction of the fuel pump may be able to continue to draw fuel even in such a situation.

As shown in FIG. 1, a metallic bracket 3 is fixedly secured to the bottom wall 2 of the fuel tank, for instance by welding, and a main body 4 of the chamber assembly 1 made of POM (polyacetal) resin material and molded into the shape of a box having an open top is fixedly secured to the tank bracket 3.

Figure 2:
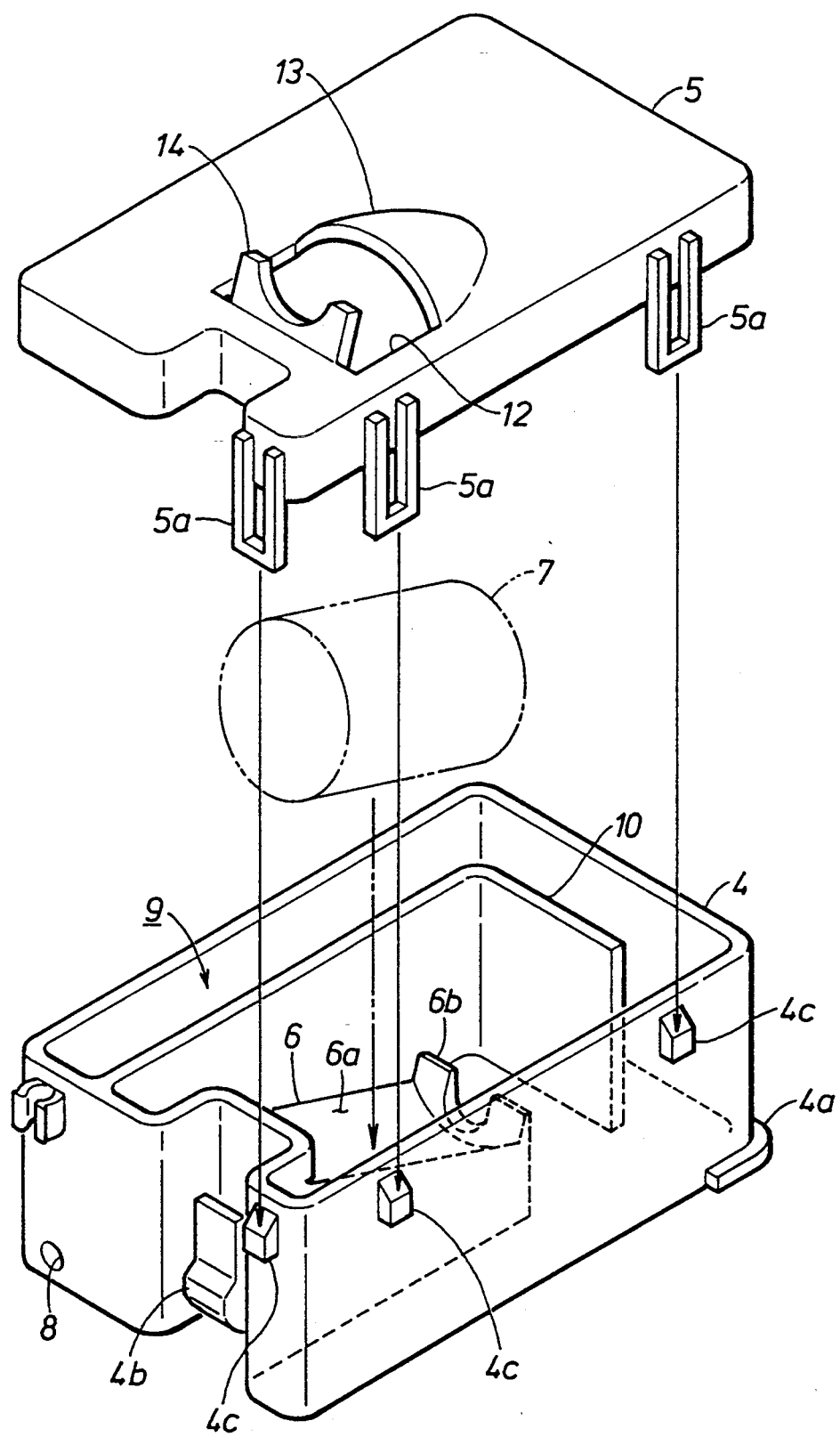
FIG. 2 is an exploded perspective view of the assembly shown in FIG. 1.

As best shown in FIG. 2, an external flange 4a extends laterally from a bottom wall of the main body 4, and a resilient engagement piece 4b extends vertically from the other end of the bottom wall of the main body 4. Thus, the chamber assembly main body 4 can be secured to the tank bracket 3 by first engaging the flange 4a with a hook 3a provided in the tank bracket 3 and then engaging the resilient engagement piece 4b with an engagement claw or a recess 3b provided in a corresponding part of the tank bracket 3.

The chamber assembly 1 further comprises a lid member 5 likewise made of molded POM resin material for closing the open top of the main body 4. The peripheral part of the open top of the main body 4 is provided with a plurality of lateral projections 4c, and the corresponding parts of the lid member 5 are provided with elastic or resilient annular hooks 5a appending therefrom for engagement with the corresponding projections 4c. Thus, when the lid member 5 is pushed onto the top end of the main body 4, the annular hooks 5a are resiliently engaged with the corresponding projections 4c, thereby securing the lid member 5 on the main body 4, and defining a substantially enclosed fuel pump inlet chamber therein. In the illustrated embodiment, six pairs of such annular hooks 5a and corresponding projections 4c are provided around the corresponding members, but only three pairs of them are shown in FIG. 2.

The chamber assembly main body 4 is internally provided with a pump support base 6 which is integrally molded with the main body 4. The pump support base 6 comprises a concave part-cylindrical support surface 6a facing substantially upward and sloping down from the wall of the main body adjacent to the resilient engagement piece 4b, and a stopper 6b standing upright from a lower end of the support surface 6b. The support surface 6a is substantially complementary to the outer surface of the fuel pump 7, and can support the fuel pump 7 in a stable manner in cooperation with the stopper 6b as illustrated in FIG. 1. When the fuel pump 7 is supported by the pump support base 6 in this manner, a filter 7b provided at an extreme end of a fuel pump inlet tube 7a leading to a fuel inlet of the fuel pump 7 is positioned immediately next to the bottom wall of the main body 4.

A relatively small fuel inlet opening 8 is provided in a lower part of the wall of the main body 4 adjacent to the engagement piece 4b, and serves as a substantially sole channel of fuel communication in and out of the fuel pump inlet chamber defined inside the main body 4. The main body 4 is further provided with an L-shaped vertical wall 10 defining a relatively narrow, L-shaped fuel passage 9 communicating the fuel inlet opening 8 with the main part of the fuel pump inlet chamber. The lid member 5 is provided with an associated L-shaped rib 11 (FIG. 1) which closely abuts the upper end of the L-shaped vertical wall 10 when the lid member 5 is mounted on the upper open end of the main body 4.

Thus, because the main part of the fuel pump inlet chamber, from which the inlet tube 7a of the fuel pump 7 draws fuel, communicates with the relatively small fuel inlet opening 8 via the relatively narrow L-shaped fuel passage 9, even when the vehicle has made a sharp turn at a relatively high travelling speed, and a bulk of the fuel in the fuel tank has moved laterally to one side of the fuel tank, the fuel in the fuel pump inlet chamber is prevented from rapidly ejected therefrom, and the fuel pump inlet tube is prevented from drawing air. In other words, the fuel pump is prevented from drawing air, instead of fuel, before the fuel level becomes truly low, due to such local and temporary unevenness in the fuel level of the fuel tank.

The lid member 5 is provided with an opening 12 and an adjacent curved portion 13 for allowing a part of the fuel pump 7 to be exposed above the lid member while the curved portion 13 closely abuts the upper surface of the fuel pump 7 adjacent to its exposed part. Thus, the curved portion 13 provides a holding surface 13a in clamping the fuel pump between the support surface 6a and the curved portion 13. The lid member 5 is further provided with a stopper 14 projecting upright from the lid member 5 at an end of the opening 12 opposite to the curved portion 13 to engage the upper axial end of the fuel pump 7.

According to this fuel pump inlet chamber assembly 1, the main body 4 is mounted on the bottom wall 2 of the fuel tank via the tank bracket 3, and after the fuel pump 7 is placed on the pump support base 6, the lid member 5 is engaged with the main body 4 by means of the engagement between the lateral projections 4c of the main body with the annular hooks 5a of the lid member 5. As a result, the fuel pump 7 is securely interposed between the support surface 6a and the holding surface 13a of the curved portion 13, and its axial movement is restrained by the stoppers 6b and 14 provided in the main body 4 and the lid member 5. Thus, the fuel pump 7 can be secured in a stable manner without requiring any pump mount bracket. If desired, an elastic layer or block made of rubber or the like may be placed between the fuel pump 7 and the main body 4, and between the fuel pump 7 and the lid member 5.

Because the mounting of the fuel pump 7 is accomplished by the closing of the lid member 5 onto the main body 4, access to the fuel pump 7 is facilitated, and not only the assembling work is simplified but also the servicing work involving, for instance, replacement of the fuel pump 7 is simplified.

The mounting of the main body 4 onto the bottom wall 2 of the fuel tank can be achieved in a number of different ways. For instance, the main body 4 may be provided with a pair of elastic engagement pieces similar to the engagement piece 4b at diagonally opposed positions of the main body 4 while the tank bracket has a pair of corresponding engagement claws or openings without using the engagement between a bottom flange of the main body with an associated claw of the tank bracket. If desired, by thus using a readily detachable mode of mounting the main body onto the tank bracket, it is also possible to allow removal of the entire fuel pump inlet chamber assembly for servicing purpose.

Thus, the present invention provides an improved fuel pump inlet chamber assembly which allows a fuel pump to be secured in a simple and readily accessible manner.

Although the present invention has been described in terms of a specific embodiment thereof, it is possible to modify and alter details thereof without departing from the spirit of the present invention.

What we claim is:

1. A fuel pump inlet chamber assembly for a vehicle fuel tank, comprising:

a substantially hollow chamber main body including a bottom wall, a surrounding side wall and an open top;

a pump support surface defined in an elevated part of said bottom wall, said pump support surface consisting essentially of a semi-cylindrical surface having an inclined axial line;

tank bracket means for securing said chamber main body to a bottom wall of a fuel tank;

a lid member adapted to be mounted on said open top of said chamber main body my means of engagement means so as to define a substantially enclosed fuel pump inlet chamber inside said chamber main body in cooperation with said bottom wall and said side wall of said chamber main body;

a pump holding surface provided in said lid member, said holding surface consisting essentially of a semi-cylindrical surface having an axial line substantially in parallel with said axial line of said pump support surface so as to define a substantially cylindrical cavity between said pump support surface and said holding surface;

a communication passage provided in said chamber main body for communicating said fuel pump inlet chamber with outside at a limited flow rate; and a fuel pump having a substantially cylindrical outer profile and interposed between said pump support surface of said chamber main body and said holding surface of said lid member.

2. A fuel pump inlet chamber assembly according to claim 1 wherein said lid member is provided with an opening adjacent to said holding surface for exposing a part of said fuel pump.

3. A fuel pump inlet chamber assembly according to claim 1, wherein said holding surface and said pump support surface are each provided with a stopper for restricting axial movement of said fuel pump.

4. A fuel pump inlet chamber assembly according to claim 1, wherein said tank bracket means secures said chamber main body to said bottom wall of said fuel tank by means of at least one elastic latch.

5. A fuel pump inlet chamber assembly according to claim 1, wherein said engagement means for mounting said lid member to said chamber main body comprises an elastic latch.

* * * * *